United States Patent
Hähre et al.

(10) Patent No.: US 10,686,368 B2
(45) Date of Patent: Jun. 16, 2020

(54) POWER ELECTRONIC MODULE FOR A CHARGING STATION AND CORRESPONDING CHARGING STATION AND ELECTRICITY CHARGING STATION

(71) Applicant: Dr. Ing. h.c. F. Porsche Aktiengesellschaft, Stuttgart (DE)

(72) Inventors: Karsten Hähre, Dudenhofen (DE); Raoul Heyne, Wiernsheim (DE); Marija Jankovic, Stuttgart (DE); Christian Metzger, Tamm (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/225,697

(22) Filed: Dec. 19, 2018

(65) Prior Publication Data
US 2019/0190390 A1 Jun. 20, 2019

(30) Foreign Application Priority Data
Dec. 19, 2017 (DE) ........................ 10 2017 130 498

(51) Int. Cl.
*H02M 1/42* (2007.01)
*H02M 1/084* (2006.01)
(Continued)

(52) U.S. Cl.
CPC .............. *H02M 1/42* (2013.01); *B60L 53/20* (2019.02); *B60L 53/31* (2019.02); *H02J 7/0027* (2013.01);
(Continued)

(58) Field of Classification Search
CPC .... H02M 7/487; H02M 7/483; H02M 7/2173; H02M 3/33523; H02M 3/33569;
(Continued)

(56) References Cited

U.S. PATENT DOCUMENTS 7,474,081 B2 * 1/2009 Colombi ............. H02M 1/4216
323/266
7,920,393 B2 * 4/2011 Bendre ................. H02M 7/487
363/127
(Continued)

FOREIGN PATENT DOCUMENTS

CH         707553 A2    8/2014
DE  102008028952 A1   12/2009
(Continued)

OTHER PUBLICATIONS

Kolar et al., "The Essence of Three-Phase PFC Rectifier Systems", IEEE 33rd International Telecommunications Energy Conference (INTELEC), Amsterdam, 2011—pp. 1-27.
(Continued)

*Primary Examiner* — Alex Torres-Rivera
(74) *Attorney, Agent, or Firm* — RatnerPrestia

(57) ABSTRACT

A power electronic module (10) for a charging station having an input-side power factor correction circuit, a voltage link and an output-side DC chopper. The power factor correction circuit is of three-phase (11) design for three-phase current; each phase (11) has at least one high-voltage-side switch and one low-voltage-side switch; and diodes that prevent current from flowing back are installed. Also disclosed is a corresponding charging station and an electricity charging station.

8 Claims, 1 Drawing Sheet

(51) Int. Cl.
  B60L 53/20 (2019.01)
  H02M 7/217 (2006.01)
  B60L 53/31 (2019.01)
  H02M 7/06 (2006.01)
  H02J 7/00 (2006.01)
  H02M 3/158 (2006.01)
  H02M 1/00 (2006.01)
  H02M 7/487 (2007.01)

(52) U.S. Cl.
  CPC ......... *H02M 1/084* (2013.01); *H02M 1/4216* (2013.01); *H02M 1/4225* (2013.01); *H02M 7/06* (2013.01); *H02M 7/2173* (2013.01); *H02M 3/158* (2013.01); *H02M 7/487* (2013.01); *H02M 2001/007* (2013.01); *H02M 2003/1586* (2013.01)

(58) Field of Classification Search
  CPC ...... H02M 1/084; H02M 1/4225; H02M 1/10; H02M 2001/0058; H02M 1/4216; H02M 1/4233; H02M 7/162; H02M 7/7575; B60L 53/20; H02J 7/022
  USPC ...................................... 323/266; 363/86, 87
  See application file for complete search history.

(56) References Cited

U.S. PATENT DOCUMENTS

| | | | |
|---|---|---|---|
| 8,169,797 B2 | 5/2012 | Coccia et al. | |
| 8,653,931 B2* | 2/2014 | Xu | H02P 9/02 336/234 |
| 9,590,521 B2* | 3/2017 | White | H02M 5/458 |
| 2012/0049794 A1 | 3/2012 | Han et al. | |
| 2012/0199409 A1 | 8/2012 | Nakamura et al. | |
| 2013/0088196 A1 | 4/2013 | Chen et al. | |
| 2013/0134935 A1* | 5/2013 | Maitra | B60L 53/11 320/109 |
| 2013/0334879 A1 | 12/2013 | Ido et al. | |
| 2014/0369101 A1 | 12/2014 | Nguyen | |
| 2015/0042159 A1 | 2/2015 | Kim et al. | |
| 2016/0172976 A1* | 6/2016 | Mu | H02M 7/487 323/271 |
| 2017/0222574 A1* | 8/2017 | Lewis | H02M 7/53871 |

FOREIGN PATENT DOCUMENTS

| | | |
|---|---|---|
| DE | 102012203612 A1 | 9/2013 |
| EP | 2892136 A1 | 7/2015 |
| JP | 2004104909 A | 4/2004 |
| JP | 2011036117 A | 2/2011 |
| JP | 2012222999 A | 11/2012 |
| JP | 2013118758 A | 6/2013 |

OTHER PUBLICATIONS

Wang et al., "Transportation Electrification: Conductive Charging of Electrified Vehicles", IEEE Electrification Magazine, vol. 1, No. 2, Dec. 2013—pp. 46-58.

Chen et al., "Isolated Bidirectional Grid-Tied Three-Phase AC-DC Power Conversion Using Series-Resonant Convertor Modules and a Three-Phase Unfolder", IEEE Transactions on Power Electronics, vol. 32, No. 12, Dec. 2017—pp. 9001-9012.

De Oliveira et al., "Comparative Evaluation of Three-Phase PFC Rectifiers for Mains Interfacing of On-Board Electric Vehicle Battery Charging Systems", IEEE 13th Brazilian Power Electronics Conference and 1st Southern Power Electronics Conference (COBEP/SPEC), Fortaleza, 2015—pp. 1-6.

Foureaux et al., "Command Generation for Wide-Range Operation of Hysteresis-Controlled Vienna Rectifiers", IEEE Transactions on Industry Applications, vol. 51, No. 3, May-Jun. 2015—pp. 2373-2379.

Hu et al., "On a DC Micro-Grid Incorporating with Electric Vehicle as Movable Energy Storage Source", IEEE International Conference on Industrial Technology (ICIT), Seville, 2015—pp. 2606-2611.

Aimtec, "Application Note A014e Connecting AC-DC and DC-DC Power Converters in Parallel", 2012, downloaded from the internet https://aimtec.com/site/Aimtec/files/documents/ApplicationNotes/connectng%20converters%20in%20parallel.pdf, 2 pages.

Japanese Notice of Reasons for Refusal for Japanese Application No. 2018-235254, dated Dec. 11, 2019, 3 pages.

* cited by examiner

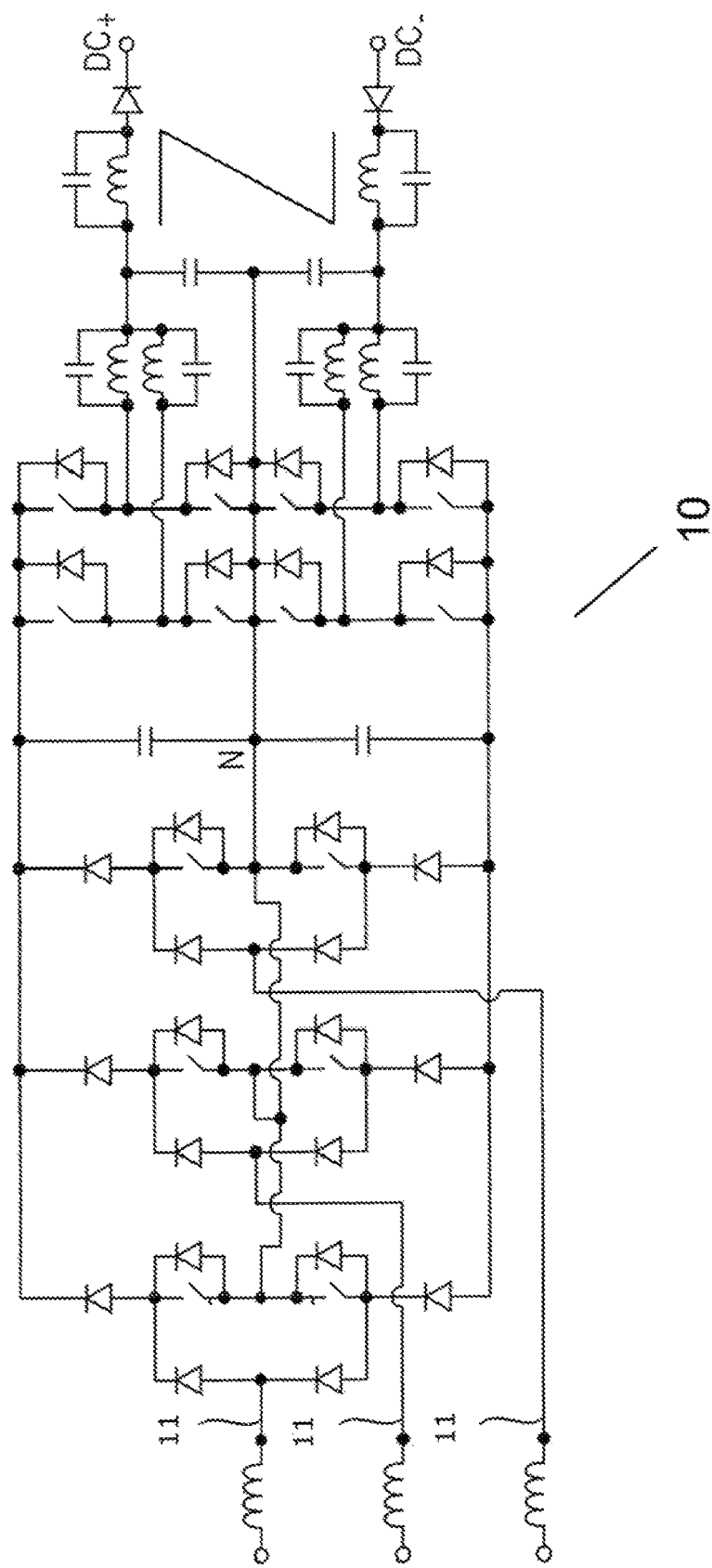

POWER ELECTRONIC MODULE FOR A CHARGING STATION AND CORRESPONDING CHARGING STATION AND ELECTRICITY CHARGING STATION

CROSS-REFERENCE TO RELATED APPLICATION

This application claims priority to German Patent Application No. DE 10 2017 130 498.3, filed Dec. 19, 2017, which is incorporated by reference herein in its entirety.

FIELD OF THE INVENTION

The present invention relates to a power electronic module for a charging station. The present invention furthermore relates to a corresponding charging station and to an electricity charging station comprising such a charging station.

BACKGROUND OF THE INVENTION

In electrical engineering, the term charging station denotes any stationary apparatus or electrical installation which serves to feed energy to mobile rechargeable battery-operated devices, machines or motor vehicles by simple positioning or plugging-in, without necessarily having to remove the energy storage element—for instance the traction battery of an electric automobile. Charging stations for electric automobiles are sometimes also referred to as "electricity charging stations" and can comprise a plurality of charging points.

Known systems here include, in particular, DC rapid charging systems (high performance charging, HPC) such as the so-called combined charging system (CCS) widely used in Europe. In DC charging of the generic type, direct current is fed from the charging column directly into the vehicle and, for this purpose, is provided from the electricity grid by means of a powerful rectifier or at solar charging stations, for example, by means of large buffer rechargeable batteries. In the vehicle there is a battery management system, which communicates directly or indirectly with the charging column in order to adapt the current intensity or to end the process upon reaching a capacity limit.

In this case, the power electronics are usually situated in the charging column. Since the DC connections of the charging column are directly connected to corresponding connections of the traction battery, high charging currents can thus be transmitted with low losses, which enables short charging times.

A wide variety of topologies for the power electronics are used in the various charging stations that are used worldwide. Charging stations that additionally use an energy storage element in the form of a battery are also already known. Most commercially available charging stations have an internal galvanic isolation, such that the electrical circuit of the power electronics must also provide such an isolation. In this case, conventional charging columns use standard circuits with B6 or B12 bridges and are realized with conventional IGBT technology.

US2013088196A, DE102012203612A1, US2013334879A, US2012049794A, US2012199409A and US2015042159A, all of which are incorporated by reference herein, relate to charging stations for electric or hybrid vehicles with corresponding power electronics on the basis of a DC chopper (DC/DC converter) and—with the exception of US2012199409A, which is incorporated by reference herein, —power factor correction (PFC). The power electronics in accordance with US2013088196A, DE102012203612A1 and US2013334879A, all of which are incorporated by reference herein, here in each case comprise a metal oxide semiconductor field effect transistor (MOSFET) assigned to the power factor correction and, in the case of US2013088196A, which is incorporated by reference herein, in addition a pulse width modulated rectifier. In the DC/DC converter in accordance with US2015042159A, which is incorporated by reference herein, both high- and low-voltage side are assigned to a MOSFET.

SUMMARY OF THE INVENTION

Described herein is a power electronic module for a charging station, a corresponding charging station and a corresponding electricity charging station.

The approach according to aspects of the invention relates to the insight that there are very many different ways of implementing a converter circuit or a converter design in a charging station. Many circuits usually contain a galvanic isolation. The electrical circuits are important in this respect especially since they have to prevent current from flowing back and internal loops. Many solutions have very different efficiencies.

By contrast, the invention relates to the objective of demonstrating an electrical circuit for a power electronic module without galvanic isolation.

One advantage of this solution resides in its compactness, such that a charging station according to aspects of the invention obstructs visibility in road traffic as little as possible. This is made possible by the use of a very fast converter topology having a high switching frequency. In this case, the efficiency of the power electronics proposed is comparatively high at more than 96%.

In this way, a single module can have a mass of less than 40 kg. This mass may still just be lifted by one person (maintenance personnel), which affords particular ease of maintenance for the solution presented.

The use of MOSFETs on the basis of silicon carbide (SiC) may further enhance the apparatus with regard to mass, efficiency and structural space—for instance in comparison with an embodiment based on corresponding insulated gate bipolar transistors (IGBTs).

Further advantageous configurations of the invention include the fully symmetrical design of the module, which is provided by virtue of the fact that the AFC and buck converter have the same neutral conductor.

Furthermore, it is very expedient for the DC/DC buck converter to be of doubly interleaved design.

BRIEF DESCRIPTION OF THE DRAWING

One exemplary embodiment of the invention is illustrated in the drawing and is described in greater detail below.

The FIGURE shows the converter design of the power electronic modules.

DETAILED DESCRIPTION OF THE INVENTION

The FIGURE is an electrical circuit diagram that illustrates the possible configuration of a power electronic module 10 according to aspects of the invention, an active PFC being provided at the input of said power electronic module. Said PFC relates to a so-called Vienna rectifier in accordance with EP0660498B1, which is incorporated by reference herein, with the difference that there are two MOSFETs: one for the high-voltage side and one for the low-voltage side.

The active frontend having power factor control (PFC) has additional diodes in the path 11 that prevent current from flowing back. Said diodes are necessary on account of the absence of galvanic isolation, as a result of which the efficiency is higher. The circuit used respectively had to be used because only it is expedient for such a requirement.

Downstream of a link circuit there is a DC/DC converter having a diode at the output in each current path in order that no current can flow in the wrong direction. These diodes are advantageous since the power electronic module 10 has no galvanic isolation.

What is claimed is:

1. A power electronic module for a charging station, said power electronic module comprising:
   an input-side power factor correction circuit, a direct current (DC) voltage link having DC link capacitors, and an output-side DC chopper, wherein:
      the input-side power factor correction circuit is of three-phase design including input alternating current (AC) three-phase lines for three-phase current, and each phase has at least one high-voltage-side switch and one low-voltage-side switch,
      the input-side power factor correction circuit includes diodes in each leg configured to prevent current from flowing back, and
      the input AC three-phase lines are directly connected to a connection node between the diodes of each leg of the input-side power factor correction circuit, and
   wherein the output-side DC chopper includes:
      on both a high-voltage side and a low-voltage side:
         two legs of active switches side directly connected to a node between the DC link capacitors of the DC voltage link,
         respective first and second pairs of output-side capacitors and inductors connected in parallel and then in series to a respective third pair of output-side capacitors and inductors,
         a respective intermediate capacitor connected between the in series connection of the respective first and second pairs to the respective third pair, and
         respective first and second input connections to connect the respective first and second pairs to different ones of the two legs of active switches, and
      a neutral connection point between the at least two intermediate capacitors connected to the two legs of active switches.

2. The power electronic module as claimed in claim 1, wherein:
   the power electronic module is of fully symmetrical design, and,
   an active frontend, which includes the input-side power factor correction circuit and the output-side DC chopper, have a common neutral conductor (N).

3. The power electronic module as claimed in claim 2, wherein the buck converter is of polyphase design.

4. The power electronic module as claimed in claim 1, wherein the switches are electronic semiconductor components.

5. The power electronic module as claimed in claim 4, wherein the electronic semiconductor components are transistors.

6. The power electronic module as claimed in claim 5, wherein the transistors are field effect transistors.

7. The power electronic module as claimed in claim 5, wherein the transistors are insulated gate bipolar transistors.

8. The power electronic module as claimed in claim 6, wherein the transistor material comprises silicon carbide.

* * * * *